US006770986B2

(12) United States Patent
Nagao et al.

(10) Patent No.: US 6,770,986 B2
(45) Date of Patent: Aug. 3, 2004

(54) POWER CONVERTER, POWER GENERATING APPARATUS AND PLUG

(75) Inventors: Yoshitaka Nagao, Kyoto (JP); Masahiro Mori, Kyoto (JP); Yuji Inoue, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 09/957,238

(22) Filed: Sep. 21, 2001

(65) Prior Publication Data

US 2002/0036432 A1 Mar. 28, 2002

(30) Foreign Application Priority Data

Sep. 27, 2000 (JP) .................................... 2000/293274

(51) Int. Cl.[7] .................................... H02H 1/04
(52) U.S. Cl. .................................... 307/326
(58) Field of Search .................................... 307/326; 439/140, 439/141, 488, 491

(56) References Cited

U.S. PATENT DOCUMENTS 2,396,901 A * 3/1946 Tiffany .................... 439/140
3,210,717 A * 10/1965 Brown .................... 439/140
3,721,889 A * 3/1973 Sondermeyer .................... 363/89
3,754,205 A * 8/1973 Lenkey .................... 439/141
3,763,457 A * 10/1973 Whippo .................... 439/141
3,880,491 A * 4/1975 Ferro et al. .................... 439/485
4,126,369 A * 11/1978 Rapata et al. .................... 439/488
4,340,267 A * 7/1982 Nukaga .................... 439/141
5,030,119 A * 7/1991 Lowe .................... 439/141
5,123,861 A * 6/1992 Verge .................... 439/522
5,252,082 A * 10/1993 Hsieh et al. .................... 439/141
5,252,141 A 10/1993 Inoue et al. .................... 136/251
5,256,076 A * 10/1993 Hamlin .................... 439/188
5,480,494 A 1/1996 Inoue .................... 136/251
5,518,411 A * 5/1996 Belleci .................... 439/141
5,583,057 A 12/1996 Inoue .................... 437/2
5,613,863 A 3/1997 Klaus et al. .................... 439/131
5,869,956 A 2/1999 Nagao et al. .................... 323/299
5,892,354 A 4/1999 Nagao et al. .................... 323/299
5,986,354 A 11/1999 Nagao et al. .................... 307/64
6,184,461 B1 * 2/2001 Flegel .................... 174/50
6,231,358 B1 * 5/2001 Kerr et al. .................... 439/140
6,311,436 B1 11/2001 Mimura et al. .................... 52/173.3

FOREIGN PATENT DOCUMENTS

EP 0071724 6/1982
EP 0 409 226 A2 7/1990
JP 07-282887 10/1995
JP 9-283205 10/1997

OTHER PUBLICATIONS

Machine translation of JP–07–282887, pub date: Oct. 27, 1995.*
Machine translation of JP–09–283205, pub date: Oct. 31, 1997.*

* cited by examiner

*Primary Examiner*—Gregory J. Toatley, Jr.
(74) *Attorney, Agent, or Firm*—Fitzpatrick, Cella, Harper & Scinto

(57) ABSTRACT

Provided are a plug that makes it possible to readily connect a power supply such as a solar battery or fuel cell to an external load or system power and to enhance safety, as well as a power converter and power generating apparatus having the plug. The plug has a movable insulating member for covering the plug electrodes when the plug is connected to an outlet and for exposing the electrodes when the plug is not connected to the outlet. In another example of the plug, the plug has at least two electrodes and switches corresponding to respective ones of the electrodes, wherein the switches are opened (turned off) when the plug is pulled out of the outlet. In still another example of the plug, the plug has at least two electrodes and a switch that is opened/closed in dependence upon the state of the connection between the electrodes and the outlet. When the plug is connected to the outlet, the switch is closed (turned on) to thereby sense the fact that the plug has been connected to the outlet.

16 Claims, 12 Drawing Sheets

POWER CONVERTER, POWER GENERATING APPARATUS AND PLUG

FIELD OF THE INVENTION

This invention relates to a power converter, power generating apparatus and plug for connecting a power supply such as a solar battery, wind power generator or fuel cell to a load or commercial power.

BACKGROUND OF THE INVENTION

Global warming, depletion of fossil fuels, nuclear accidents and radioactive contamination caused by radioactive waste have become problems in recent years, and interest in the global environment and energy resources growing rapidly. Under these circumstances, it is hoped that solar batteries and the like will serve as an inexhaustible and clean energy source and that fuel cells will serve as a power generating devices that produce little or no emissions of carbon dioxide.

System configurations for utilizing solar batteries vary in scale, from several watts to several thousand kilowatts. Such systems are of diverse types. For example, there are systems that utilize power directly, systems that store up power in batteries and systems in which the solar battery is utilized in cooperation with a commercial power source. Solar batteries that can be installed on the roof of one's home have been introduced and are becoming increasingly popular.

Consideration has also been given to a system configuration in which a small-size power generating apparatus referred to as an MIC (Module Integrated Converter), which converts DC power from a solar battery to AC power, is mounted for each solar battery module and a plug for extracting the alternating current is connected directly to a domestic outlet. A system of this kind is such that electrical connection work and installation work can be performed simply. It is also hoped that mass production of the power generating apparatus will lower cost.

A domestic outlet usually is provided in order to use a load. From the standpoint of preventing electrical shock, the specifications of Japanese Patent Application Laid-Open Nos. 7-282887 and 9-283205 propose a device so adapted that a user will not receive an electrical shock when the user touches a terminal of a partially pulled-out plug. However, conventional domestic outlets and plugs are not fabricated on the premise that a power generating apparatus will be connected to them.

For example, the conventional power converter is internally provided with stand-alone operation preventing functions of two types, namely passive and active, for when reverse current flows into system power. The stand-alone operation preventing function of the passive type attempts to detect stand-alone operation based upon a change in voltage waveform or phase that occurs when there is transition from cooperative operation to stand-alone operation. On the other hand, the stand-alone operation preventing function of the active type detects stand-alone operation upon providing the power generating apparatus with a fluctuation factor that appears in the output only at the time of stand-alone operation. Stand-alone operation occurs when the AC output plug, which is in use by having been inserted into the outlet, is pulled out of the outlet, as mentioned above. In the case of the active function, therefore, this is detected, operation is stopped automatically and safety is assured.

However, with both the passive and active systems described above, it takes at least 0.5 seconds to detect and halt stand-alone operation. There is also the possibility that a malfunction will occur in the circuit that activates the stand-alone operation preventing function. Furthermore, in the case of a conventional power generating apparatus having a comparatively large capacity, the apparatus has a switch and the circuitry can be interrupted. In the case of a low-capacity power generating apparatus, however, the apparatus is connected to the outlet via a plug and the connection is easier to make because a switch is not provided. Even if a switch is provided, the plug may be pulled out inadvertently without operating the switch. In such case a situation will arise in which voltage is applied to the plug terminals. If the user touches a plug terminal, there is the danger that the user will receive an electrical shock.

In a case where a power generating apparatus, which is equipped with a power converter, and a load are connected to a current collector such as a table tap, the generated power and the power consumed by the load will attain a state of equilibrium even if a plug that has been inserted into the commercial-power side of the current collector is pulled out of the outlet. Hence there is the danger that the function for preventing stand-alone operation of the power generating apparatus will not be activated immediately. In such cases also the active terminal of the ordinary plug will be exposed.

Furthermore, a previously proposed protective cover for plug terminals is structurally weak and may break.

SUMMARY OF THE INVENTION

The present invention has been devised in order to solve, individually or collectively, the problems of the prior art described above, and an object thereof is to provide a highly safe power converter, power generating apparatus and plug that can be connected in a simple manner without using a special outlet.

According to the present invention, the foregoing object is attained by providing a plug for supplying power by being connected to an outlet, comprising: at least two electrodes; and an insulating member for covering the electrodes when the outlet and plug are not connected and exposing the electrodes when the outlet and plug are connected.

According to the present invention, the foregoing object is attained by providing a power converter having a plug for supplying power by being connected to an outlet, wherein the plug comprises: at least two electrodes; and an insulating member for covering the electrodes when the outlet and plug are not connected and exposing the electrodes when the outlet and plug are connected.

According to the present invention, the foregoing object is attained by providing a power generating apparatus having a plug for supplying power by being connected to an outlet, wherein the plug comprises: at least two electrodes; and an insulating member for covering the electrodes when the outlet and plug are not connected and exposing the electrodes when the outlet and plug are connected.

According to another aspect of the present invention, the foregoing object is attained by providing a plug for supplying power by being connected to an outlet, comprising: at least two electrodes; and switches corresponding to respective ones of the electrodes; wherein the switches are closed when the electrodes are inserted into the outlet.

According to another aspect of the present invention, the foregoing object is attained by providing a power converter having a plug for supplying power by being connected to an outlet, wherein the plug comprises: at least two electrodes; and switches corresponding to respective ones of the electrodes; wherein the switches are opened when the electrodes are inserted into the outlet.

According to another aspect of the present invention, the foregoing object is attained by providing a power generating apparatus having a plug for supplying power by being connected to a domestic outlet, wherein the plug comprises: at least two electrodes; and switches corresponding respective ones of the electrodes; wherein the switches are opened when the electrodes are inserted into the outlet.

According to yet another aspect of the present invention, the foregoing object is attained by providing a plug for supplying power by being connected to an outlet, comprising: at least two electrodes; and a switch that is opened/closed in dependence upon state of connection between the electrodes and the outlet.

According to yet another aspect of the present invention, the foregoing object is attained by providing a power converter having a plug for supplying power by being connected to an outlet, wherein the plug comprises: at least two electrodes; and a switch that is opened/closed in dependence upon state of connection between the electrodes and the outlet.

According to yet another aspect of the present invention, the foregoing object is attained by providing a power generating apparatus having a plug for supplying power by being connected to an outlet, wherein the plug comprises: at least two electrodes; and a switch that is opened/closed in dependence upon state of connection between the electrodes and the outlet.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
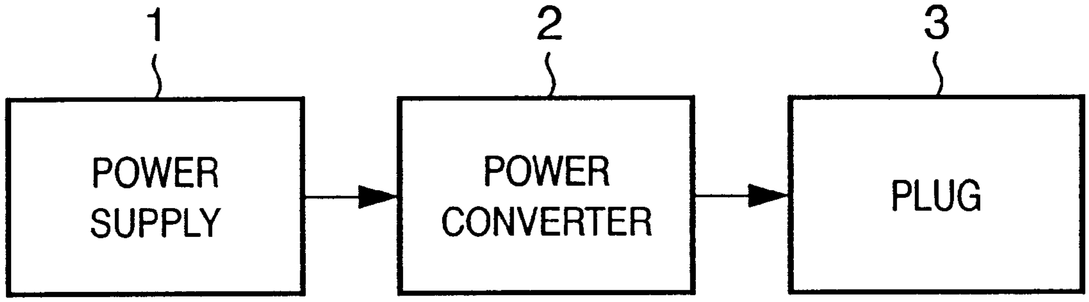
FIG. 1 is a block diagram illustrating the structure of a power generating apparatus according to the present invention.

[Structure of Power Generating Apparatus: FIG. 1]

The structure of a power generating apparatus according to the present invention is illustrated in FIG. 1. In the illustrated power generating apparatus, a power supply 1 is connected to a plug 3 of the present invention via a power converter 2.

Figure 2:
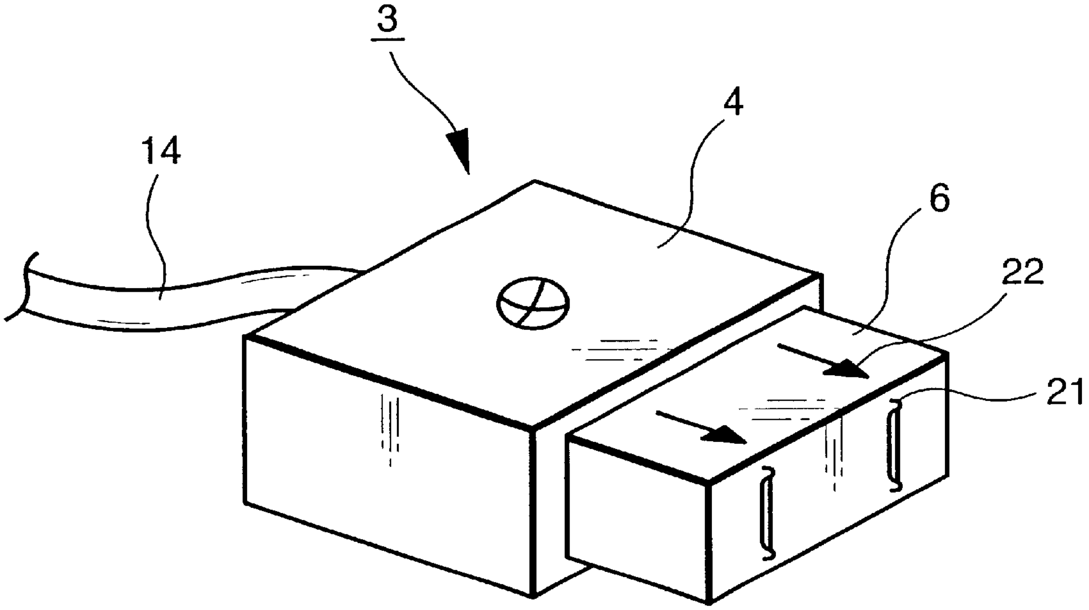
FIG. 2 is a perspective view showing an example of a plug according to the present invention.

[Plug: FIG. 2]

Figure 3A:
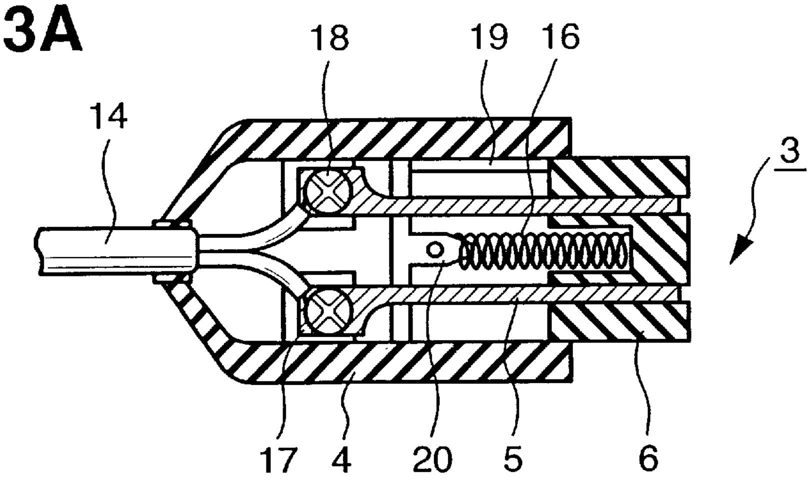
FIGS. 3A to 3C are diagrams illustrating the structure of a plug according to a first embodiment.
Figure 3B:
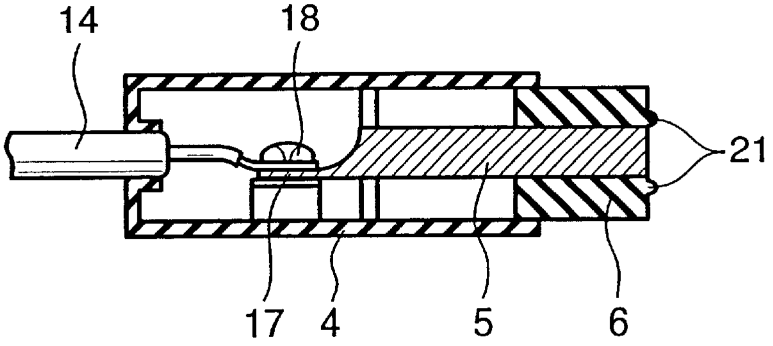
Figure 3C:
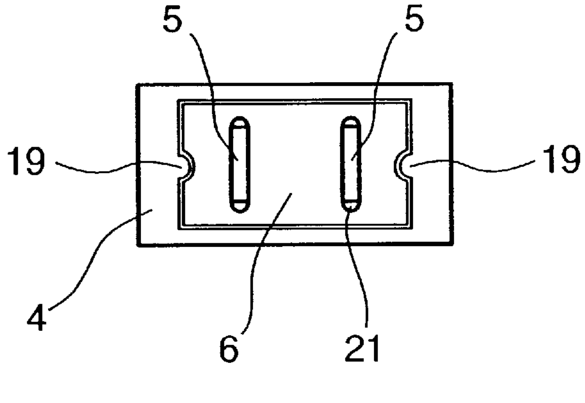
Figure 4A:
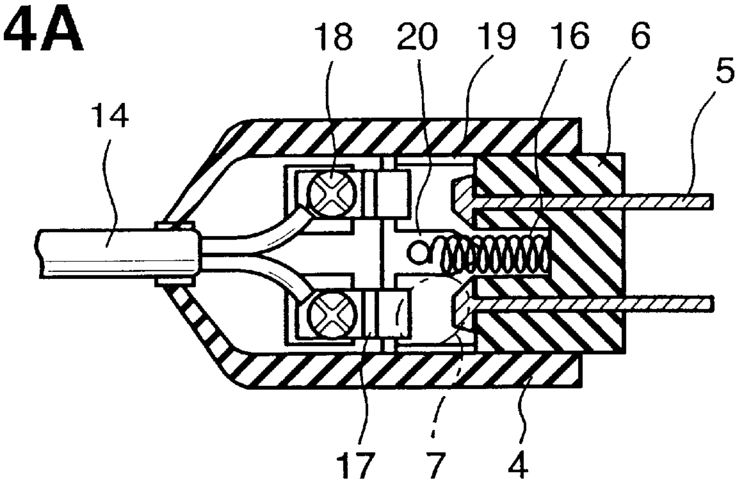
FIGS. 4A to 4C are diagrams illustrating the structure of a plug according to a second embodiment.
Figure 4B:
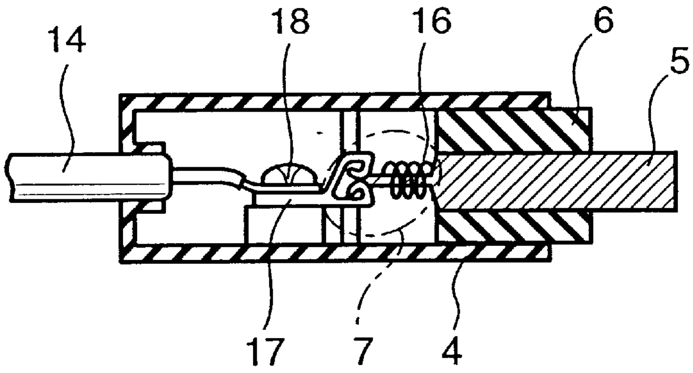
Figure 4C:
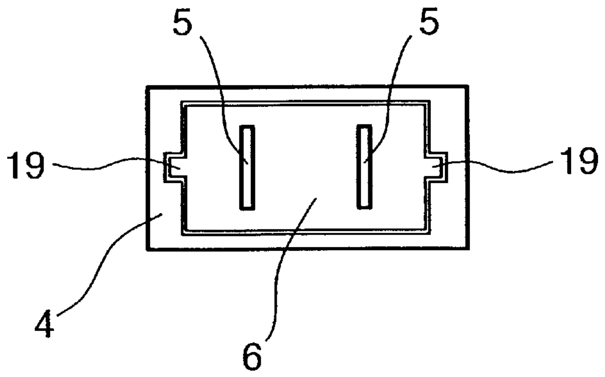
Figure 5A:
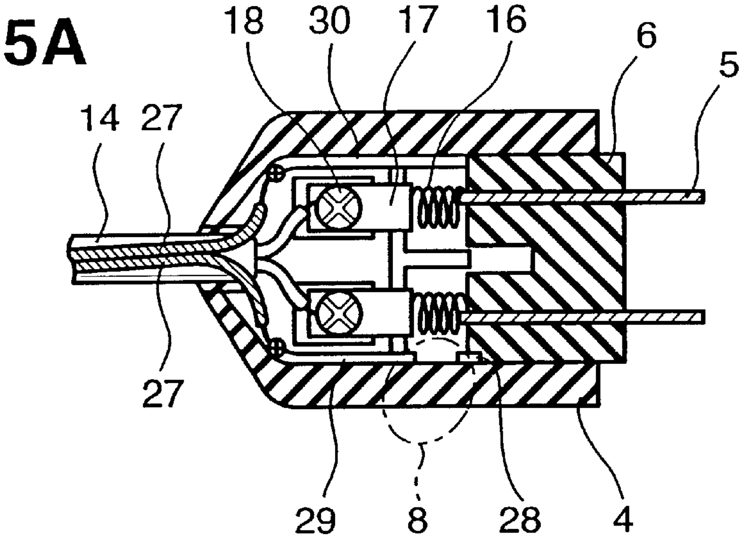
FIGS. 5A to 5C are diagrams illustrating a structure exemplifying a plug according to the present invention.
Figure 5B:
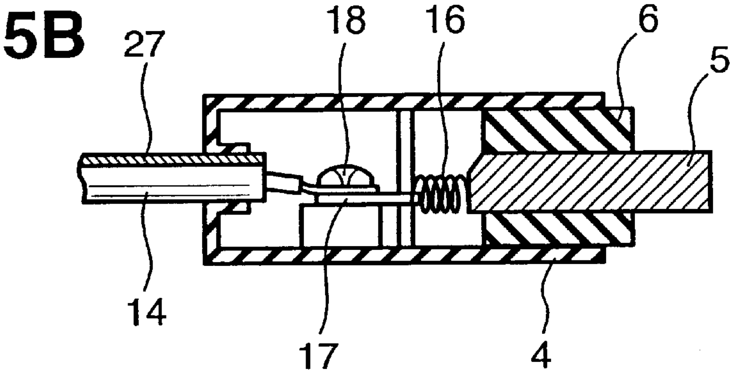
Figure 5C:
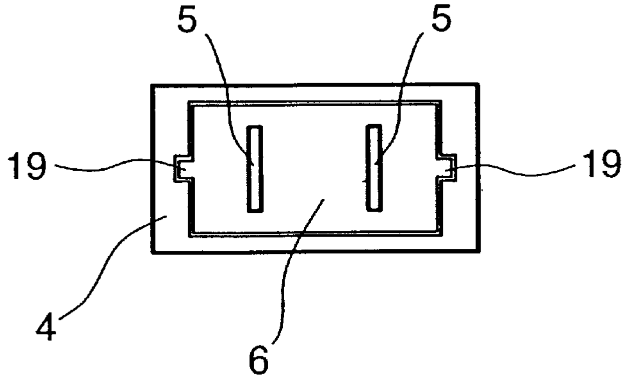

FIG. 2 is a perspective view illustrating the plug 3 of the present invention. The plug 3 according to this invention comprises a plug holder 4, conductor terminals 5 (see FIG. 3) and an insulating portion 6 for the conductor terminals 5. FIGS. 3, 4 and 5 are diagrams illustrating examples of plug structures according to the present invention. The plug 3 in these examples comprises the plug holder 4, the conductor terminals 5, the conductor-terminal insulating portion 6, a connecting portion 7 and a switch portion 8.

[Plug Structure: FIG. 3]

The plug 3 shown in FIG. 3 is constituted by the plug holder 4, the conductor terminals 5, the conductor-terminal insulating portion 6 and a resilient body 16. The plug holder 4 is provided with a terminal fitting 17 and screw 18 for attaching an electric output line 14 within a plastic case. The plug holder 4 and insulating portion 6 are provided with fitting portions 19 comprising a depression and a corresponding protrusion. The plug holder 4 has a projection 20 to which the resilient body 16 is attached. When the insulating portion 6 is pushed, it slides into and is received by the plug holder 4. When the insulating portion 6 has been received within the plug holder 4, the conductor terminals 5 protrude from the insulating portion. In order to identify the locations from which the conductor terminals 5 will protrude so that it will be easy to insert the plug into the outlet, insertion protuberances 21 and arrow indications 22 (see FIG. 2) are provided above and below the holes in the insulating portion 6 from which the conductor terminals 5 will project. In other words, the insertion protuberances 21 and arrow indications 22 serve as guides to facilitate the electrical connection of the conductor terminals 5 to the outlet.

When the plug 3 is inserted into the outlet, first the insertion protuberances 21 are aligned with and fitted into the outlet insertion holes using the arrow indications 22 as a guide, then the plug is pushed into the outlet in the manner of an ordinary plug. When the insulating portion 6 is pressed against the outlet at this time, the insulating portion 6 slides into and is received by the plug holder 4 while compressing the resilient body 16. At the same time, the conductor terminals 5 protrude from the insulating portion 6 and mate with conductor terminals within the outlet.

[Other Example of Plug Structure: FIG. 4]

The plug 3 shown in FIG. 4 is constituted by the plug holder 4, the conductor terminals 5, the conductor-terminal insulating portion 6, the connecting portion 7 and the resilient body 16. The plug holder 4 is provided with the terminal fitting 17 and screw 18 for attaching the electric output line 14 within a plastic case, and the terminal fitting 17 has been machined so that it will be contacted by the base end of the conductor terminal 5 when the conductor terminal is inserted into the outlet. (The machined portion of the terminal fitting 17 and the base end of the conductor terminal 5 construct the connecting portion 7.(switch)) The plug holder 4 and insulating portion 6 are provided with the fitting portions 19 comprising a depression and a corresponding protrusion. The plug holder 4 has the projection 20 to which the resilient body 16 is attached. When the insulating portion 6 is pushed, it, together with the conductor terminals 5, slides into and is received by the plug holder 4. The conductor terminals 5 are fixed to the insulating portion 6 so that when the insulating portion 6 has been received within the plug holder 4, the connecting portion 7(switch) attains the connected state.

When the plug 3 is inserted into the outlet, the conductor terminals 5 are inserted into the outlet insertion holes and the plug is pressed against the outlet in the manner of an ordinary plug. When the insulating portion 6 of the plug is pressed against the outlet at this time, the insulating portion 6, which is integrated with the conductor terminals 5, slides into the plug holder 4 while compressing the resilient body 16, and the base end of the conductor terminal 5 mates with the machined portion of the terminal fitting 17 to make electrical contact therewith.

[Further Example of Plug Structure: FIG. 5]

The plug 3 shown in FIG. 5 is constituted by the plug holder 4, the conductor terminals 5, the conductor-terminal insulating portion 6, the switch 8, the resilient body 16 and the terminal fitting 17. The terminal fitting 17 and conductor terminal 5 electrically connected at all times by the resilient body 16. Further, the plug is provided with signal terminal fittings 29 and 30 for controlling a start/stop signal within the power converter. The insulating portion 6 is provided with a contact fitting 28 which, together with the signal terminal fitting 29, constructs the switch 8. It should be noted that the signal terminal fitting 30 is electrically connected to the contact fitting 28 at all times. The signal from the switch 8 thus constructed can be used as the start/stop signal within the power converter. There are not particularly limited so long as the the signal terminal fitting 30 and the contact fitting 28 are connected. For example, the signal terminal fitting 30 constructs fitting portion 19 together with a part of conductor-terminal insulating portion 6 and a conductive member is padded in the insulating portion 6. The signal terminal fitting 30 and the conductive member are connected in the motion space of the conductor-terminal insulating portion 6. The conductive member and the contact fitting 28 are also connected through surface part or inner part of the conductor-terminal insulating portion 6 in order to avoid the contact with the conductor terminal 5. Further, it is preferred that the conductive member and/or the signal terminal fitting 30 have elasticity such as flat spring to thereby assure better contact. Furthermore, the conductive member may be formed as an integral part of the signal terminal fitting 30. When the plug is inserted into the outlet, the conductor terminals 5 are inserted into the outlet insertion holes and the plug is pressed against the outlet in the manner of an ordinary plug. When the insulating portion 6 of the plug is pressed against the outlet at this time, the resilient body 16 is compressed and the signal terminal fitting 29 and contact fitting 28 come into contact (closing the switch 8) so that the start/stop signal enters and activates the power converter.

Figure 6:
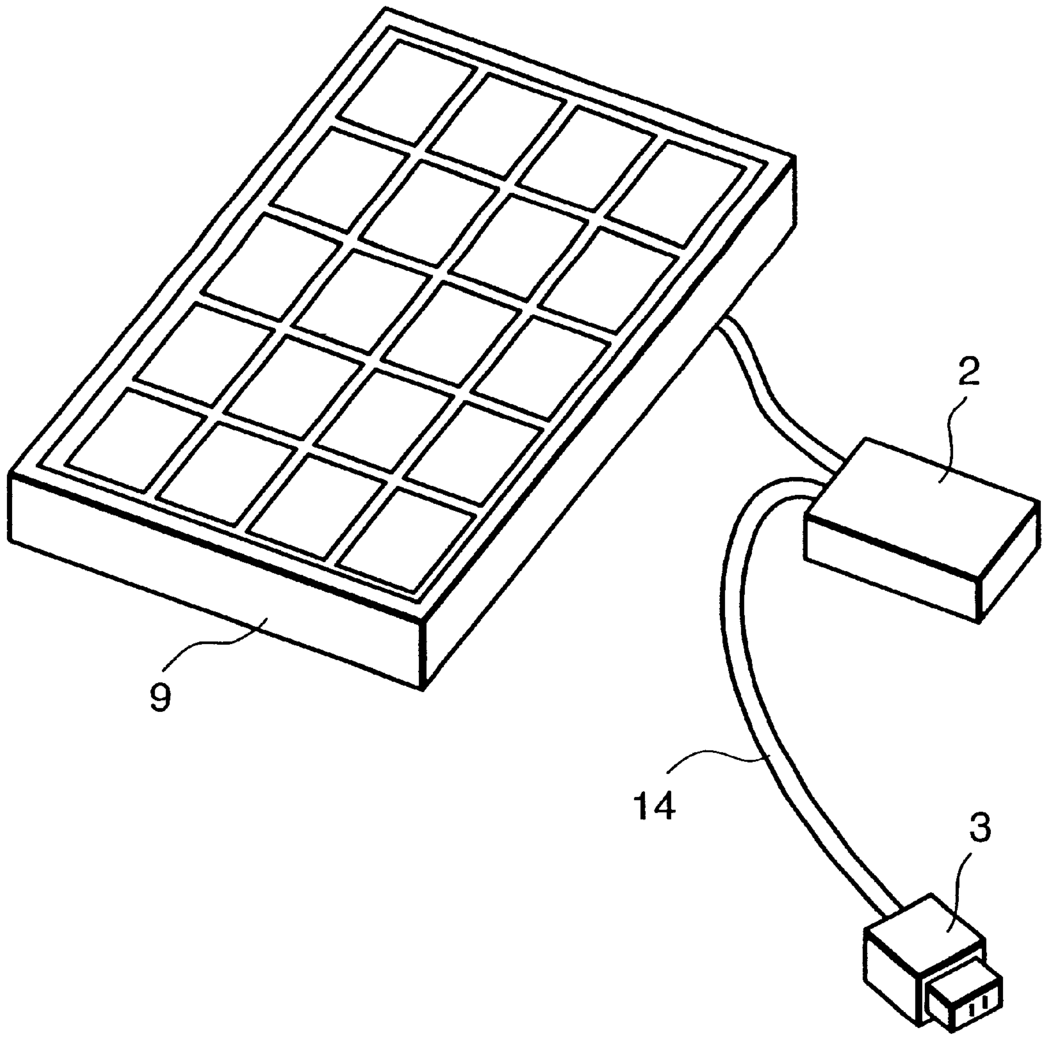
FIG. 6 is a perspective view illustrating the structure of a power generating apparatus of the present invention using a solar battery module as a power supply.

[Structure of a Power Generating Apparatus Having a Solar Battery Unit as its Power Supply: FIG. 6]

Figure 7:
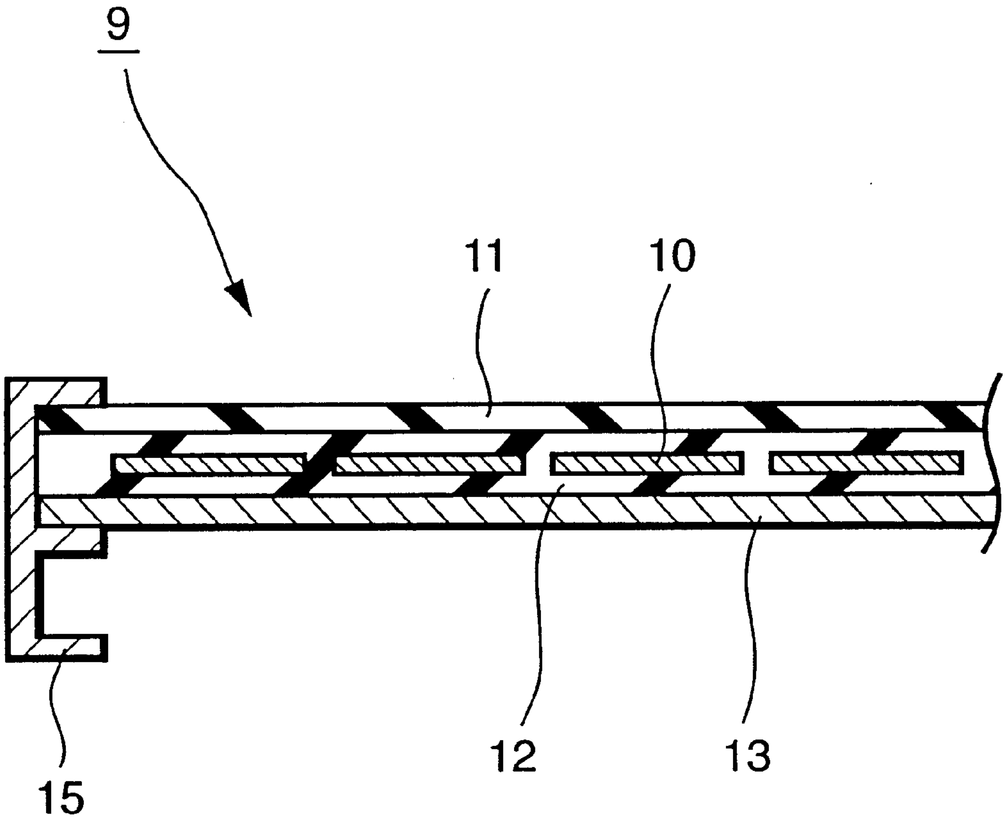
FIG. 7 is a schematic partial sectional view illustrating the structure of a solar battery module capable of being used as the power supply of a power generating apparatus according to the present invention.

FIG. 6 illustrates a structure for a case where the power supply 1 of the power generating apparatus of the present invention is a solar battery module 9. As shown in FIG. 7, the solar battery module 9 includes photovoltaic elements 10 sealed in a housing comprising a weather-resistant front cover 11, a filler 12 and a back cover 13. The power converter 2 is attached to the output side of the module 9, and the output of the power converter 2 is connected to the plug 3, which is capable of being connected to the outlet or the like.

The structural components of the power generating apparatus according to the present invention will now be described.

(Power Supply 1)

The type of power supply 1 is not particularly limited so long as it is possible of supplying power. Examples of the power supply 1 are a solar battery, fuel cell, wind power generator or battery. In the case of this invention, it is preferred that the power supply have the structure of a single module such as a solar battery module, the output of which is comparatively low.

(Power Converter 2)

The power converter 2 converts the power output from the power supply 1 to AC power. The power converter 2 generally comprises a booster circuit, a power converting circuit and a control circuit, etc.

A booster chopping circuit, a voltage doubler circuit and a serial-parallel chopper circuit, etc., can be used as the booster circuit, which boosts the input voltage to the power converting circuit a required amount. If the voltage is sufficiently high, the booster circuit is unnecessary.

It is preferred that the power converter 2 be of voltage type, in which an IGBT (Insulated-Gate Bipolar Transistor) or MOSFET (Metal Oxide Semiconductor Field-Effect Transistor) is used as the switching element in the power converting circuit. The desired output power can be obtained by driving the gate of the switching element using a control signal from the control circuit.

The control circuit is constituted by a CPU or the like and controls start/stop and the operation of the power converter 2. Further, the control circuit can detect stand-alone operation of the power converter 2 and can perform automatic shut-down. Passive and active functions for preventing stand-alone operation are available, as mentioned earlier. Examples of passive systems are a system for detecting voltage phase skipping, a system for detecting a sudden increase in voltage of third-order higher harmonics and a system for detecting a rate of change in frequency. Examples of active systems are a frequency shifting system, an effective-power fluctuation system, a reactive-power fluctuation system and a load fluctuation system. Though detection usually is performed using a combination of the passive and active systems, detection generally requires 0.5 to 1.0 seconds.

In FIG. 6, the power converter 2 is separate from the solar battery module 9. However, the power converter 2 may be attached to the back, etc., of the solar battery module 9 if desired. Further, the power converter 2 may be formed as an integral part of the plug 3.

(Plug 3)

The plug 3 comprises at least the plug holder 4, the conductor terminals 5 and the conductor-terminal insulating portion 6, as shown in FIGS. 3 to 5. The disposition and shape of the conductor terminals 5 of plug 3 must be decided in such a manner that the plug 3 will match the shape of outlets decided for various countries. This is so that the plug 3 can be connected to the commercial system. The present invention is not limited to the structure of plug 3 shown in FIGS. 3 to 5 and other structures may be used.

(Plug Holder 4)

It is desired that the plug holder 4 have structure that is insulated so that power can be connected from the power converter 2. It is desired that the conductor terminals 5 be secured internally and that there be enough space for the insulating portion 6 to be slid and accommodated therein. Further, it is desired that the plug holder 4 have depressions and protrusions to which a resilient body such as a spring or a magnet may be attached in such a manner that the insulating portion 6 will project from the plug holder 4 when the plug is pulled out of an outlet.

(Conductor Terminals 5)

These are not particularly limited so long as they are electrically conductive and possess enough strength to be inserted into an outlet or the like. More specifically, copper plates or tin-plated copper plates can be used. If the conductor terminals 5 are to be connected to an ordinary domestic outlet, they should have a shape that will allow them to be inserted into the outlet.

(Conductor-terminal Insulating Portion 6)

The insulating portion 6 is not particularly limited as long as it protects the conductor terminals 5 and is an electrical insulator. More specifically, an insulating material such as plastic can be used. Further, the shape of the insulating portion 6 according to the present invention should be such that the insulating portion 6 contacts the surface of an outlet when the plug is inserted into the outlet. It is preferred that the conductor terminals 5 protrude from the insulating portion 6 owing to pressure produced at the time of contact with the outlet.

(Connecting Portion 7)

The connecting portion 7 may be provided within the plug holder in such a manner that electricity will not flow into the conductor terminals 5 when the plug is pulled out of an outlet. In this case, the connecting portion 7 is formed in such a manner that when the plug has been inserted, the conductor terminals 5 will be inserted into the connecting portions 7 to electrically contact the same. Furthermore, it is preferred that the connecting portion 7 consist of a material exhibiting resilience to thereby assure better contact.

(Switch 8)

The switch 8 is adapted so as to be able to sense when the plug 3 has been pulled out of an outlet. That is, the switch 8 opens when the plug is pulled out and closes when the plug is inserted. A terminal that is capable of connecting a signal line to the switch 8 is provided so that the switch 8 may be utilized as a switch for starting and stopping the power converter 2. The switch 8 may be so adapted that it closes when the plug is pulled out and opens when the plug is inserted, which is the converse of the arrangement described above.

(Solar Battery Module 9)

The solar battery module 9 is constituted by the photovoltaic elements 10, front cover 11, filler 12, back cover 13 and a frame 15. Types of the module 9 include a standard module equipped with a frame and a module that is integrated with roofing material. According to the present invention, a solar battery module of any form may be used.

(Photovoltaic Element 10)

The photovoltaic element 10 used in the present invention is not particularly limited, and use can be made of a silicon semiconductor or compound semiconductor. The silicon semiconductor can be a monocrystalline semiconductor, a polycrystalline semiconductor, an amorphous silicon semiconductor, a thin-film polycrystalline semiconductor or a combination thereof.

In order to obtain the desired voltage and current, several of the photovoltaic elements 10 can be used within the solar battery module 9 in a form connected serially or in parallel by an electrically conductive material referred to as an "interconnector". Further, it is possible to use a wafer-shaped photovoltaic element or a photovoltaic element that uses stainless steel, glass or film as a substrate.

(Front Cover 11)

The front cover 11 is situated on the outermost surface of the solar battery module 9 and is used as a housing for protecting the solar battery module 9 from external contaminants, external damage and humidity. Accordingly, the front cover 11 is required to be transparent, weather resistant, contaminant resistant and mechanically strong. Examples of material that satisfy these requirements are glass, fluoroplastic film and acrylic-resin film.

In particular, if resin film is used as the material constituting the front cover 11, the solar battery module 9 will not be destroyed by externally applied impact. In addition, since resin film is much lighter than glass, use of resin film makes it possible to reduce the weight of the solar battery module 9. In other words, if the solar battery module 9 is installed on a roof, a structure that is highly resistant to earthquakes can be obtained. Furthermore, by subjecting the film to an embossing treatment, reflection of sunlight at the surface of the front cover 11 can be reduced. This facilitates work at the place of installation. In view of the above, resin film is ideal for use as a surface member for the front cover 11.

Fluoroplastic film, which excels especially in terms of resistance to weather and contaminants, is particularly preferred as the resin film. Examples of fluoroplastic film are polyvinylidene fluoride resin, polyvinyl fluoride, and ethylene tetrafluoride-ethylene copolymer. Though polyvinylidene fluoride resin is excellent from the standpoint of weather resistance, ethylene tetrafluoride-ethylene copolymer is superior in terms of both weather resistance and mechanical strength and in transparency as well. In order to improve adhesion to the resin used as the above-mentioned filler, it is preferred that the film be subjected to a surface treatment such as a corona treatment, plasma treatment, ozone treatment, ultraviolet treatment, electron-beam irradiation or flame treatment. It is also possible to use a member obtained by integrating the front cover 11 serving as the surface member and the filler 12, as in the manner of an adhesive sheet.

In a case where glass is used as the substrate of the photovoltaic element 10, the glass can also serve as the surface member by using it on the light-receiving side of the photovoltaic element. Depending upon the location of use, the front cover 11 can be dispensed with if the filler meets the requirements for weather and contamination resistance and mechanical strength satisfactorily or if a contamination preventing layer such as an optical catalyst is used on the surface.

(Filler 12)

The filler 12 is an insulating material for sealing in the photovoltaic elements 10 and interconnector and protecting the solar battery. The filler is used to cover depressions and protrusions of the photovoltaic elements 10 and interconnector with resin, to protect the photovoltaic elements 10 from severe conditions such as temperature change, humidity and impact, and to assure adhesion between the photovoltaic elements 10 and the front cover 11 and back cover 13. Accordingly, it is required that the filler 12 exhibit weather resistance, an adhesive property, filling performance, heat resistance, cold resistance and impact resistance. Specific examples of resins that satisfy these requirements are ethylene vinyl acrylate copolymer (EVA), ethylene methyl acrylate copolymer (EMA), ethylene-ethylene acrylate copolymer (EEA) and polyvinyl butyral resin. Among these, EVA is a resin most widely used heretofore as a material for covering the solar battery module 9. Accordingly, since EVA provides high reliability without requiring a major change in the composition of the conventional filler and is low in cost, EVA is the material that is particularly preferred.

If it is unnecessary to seal the photovoltaic elements 10, as when the photovoltaic elements have a weather-resistant property, or if only adhesion is required between the photovoltaic elements 10 and the covering material, as when the photovoltaic elements 10 in sealed form are affixed to the covering material, then an adhesive material or self-adhesive material may be used as the filler 12. Specific examples in such case are rubber, silicon, acrylic and vinyl ether-type materials. Among these, silicon and acrylic materials are particularly preferred because they exhibit heat resistance, cold resistance and electrical insulation. The adhesive material or self-adhesive material is used over the entire surface of the covering portion or locally at a number of points to provide the requisite adhesive force. It should be noted that a combination of the above-mentioned materials may be used as the filler.

In order to assure electrical insulation between the photovoltaic elements 10 and the outside, an insulating film can be inserted within the filler as an insulating layer. Electrical insulation usually can be maintained merely by filling the underside of the photovoltaic elements 10 with an organic polymer resin. However, in a case where the structure of the photovoltaic elements 10 is such that a variance tends to develop in the thickness of the organic polymer resin or use is made of an electrically conductive member for the back cover 13, there is the possibility that a short circuit will occur. Better safety is assured, therefore, by using an insulating film.

A flexible material that affords satisfactory electrical insulation with regard to the outside and that exhibits excellent long-term durability and is resistant to thermal expansion and contraction is preferred as the material for the insulating film. Nylon, polyethylene terephthalate and polycarbonate can be mentioned as examples of films that are ideal for use.

In the manufacturing process, a sheet member composed of a fiber material can be inserted in order to assist deairing. Examples of the material are non-woven fabric of glass fibers and woven fabric of glass fibers. The non-woven fabric of glass fibers is more advantageous in terms of cost. If a thermoplastic resin is used as the filler, the non-woven fabric of glass fibers is preferable because the space between the glass fibers can readily be filled by the thermoplastic resin.

(Back Cover 13)

The back cover 13 functions as a material that protects the underside of the photovoltaic elements 10 or as a reinforcing member. Though the material is not particularly limited, examples are a film in which aluminum foil is sandwiched by fluoroplastic, a film sandwiched by aluminum foil, fibers mixed with resin or the like, glass, a metal plate, plywood, calcium silicate, various cement plates such as a plate of cement mixed with glass fiber or light-weight foamed concrete, and resin plates of acrylic resin or polycarbonate.

In a case where a metal plate is used as the back cover 13, advantages of light weight and flame retardance are obtained in particular. Examples of metal plates that can be used in general are a steel plate that is plated with molten zinc, a steel plate that is plated with an alloy of molten zinc and 5% aluminum, a steel plate that is plated with an alloy of molten zinc and 55% aluminum, a steel plate that is plated with molten aluminum, a steel plate that is electrically plated with zinc, a steel plate that is electrically plated with an alloy, a steel plate that is electrically plated with copper, a steel plate that is plated with zinc by vapor deposition, a stainless steel plate that is plated with molten zinc, a stainless steel plate that is plated with molten aluminum, a stainless steel plate that is electrically plated with copper, a hot-rolled stainless steel plate, a cold-rolled stainless steel plate, a steel plate coated with vinyl chloride, a steel plate coated with fluoroplastic, an earthquake-resistant steel plate, a thermally insulating galvanized plate, a weather-resistant steel plate and a painted steel plate. Examples of non-ferrous plates that can be used are a copper plate, an aluminum-alloy plate, a galvanized plate, a lead plate, a titanium plate and a coated color plate.

(Electric Output Line 14)

The electric output line 14 is a wiring line for introducing electricity from the output terminal to the outside.

The electric output line 14 used in the present invention is not particularly limited. The selected line should exhibit heat resistance, cold resistance, mechanical strength, electrical insulation, durability, oil resistance, wear resistance, acid resistance and alkali resistance, which are required in dependence upon the environment in which the apparatus is used. An insulated electric wire such as one insulated by IV, KIV, HKIV, crosslinked polyethylene, fluororubber, silicone rubber and fluoroplastic can be mentioned as an example. Besides electric wire, a copper tab or copper wire also can be used as the electric output line.

When scratch resistance and wear resistance are especially required owing to conditions of use, it is preferred that a cable structure be used for the electric output line 14. Flat electric wire or ribbon-shaped electric wire can also be used. Specifically, it is possible to use 600 V polyethylene cable (EV, EE, CV, CE) specified by JIS C 3605; 600 VEP rubber-insulated cable (PN, PV) specified by JIS C 3621; 600 V vinyl-insulated vinyl-sheath (flat) cable (VVR, VVF) specified by JIS C 3342; one, two, three or four types of rubber-insulated rubber-cap tire cable (1CT, 2CT, 3CT, 4CT) specified by JIS C 3327; two, three or four types of rubber-insulated chloroprene-cap tire cable (2RNCT, 3RNCT, 4RNCT) specified by JIS C 3327; two, three or four types of EP rubber-insulated chloroprene-cap tire cable (2PNCT, 3PNCT, 4PNCT) specified by JIS C 3327; or vinyl-insulated vinyl-cap tire cable specified by JIS C 3312.

[Embodiments]

The present invention will now be described on the basis of embodiments thereof, but it should be noted that the present invention is not limited to these embodiments.

(First Embodiment)

An example of a power generating apparatus of the present invention using the solar battery module 9 as the power supply 1 will be described as a first embodiment.

Figure 8:
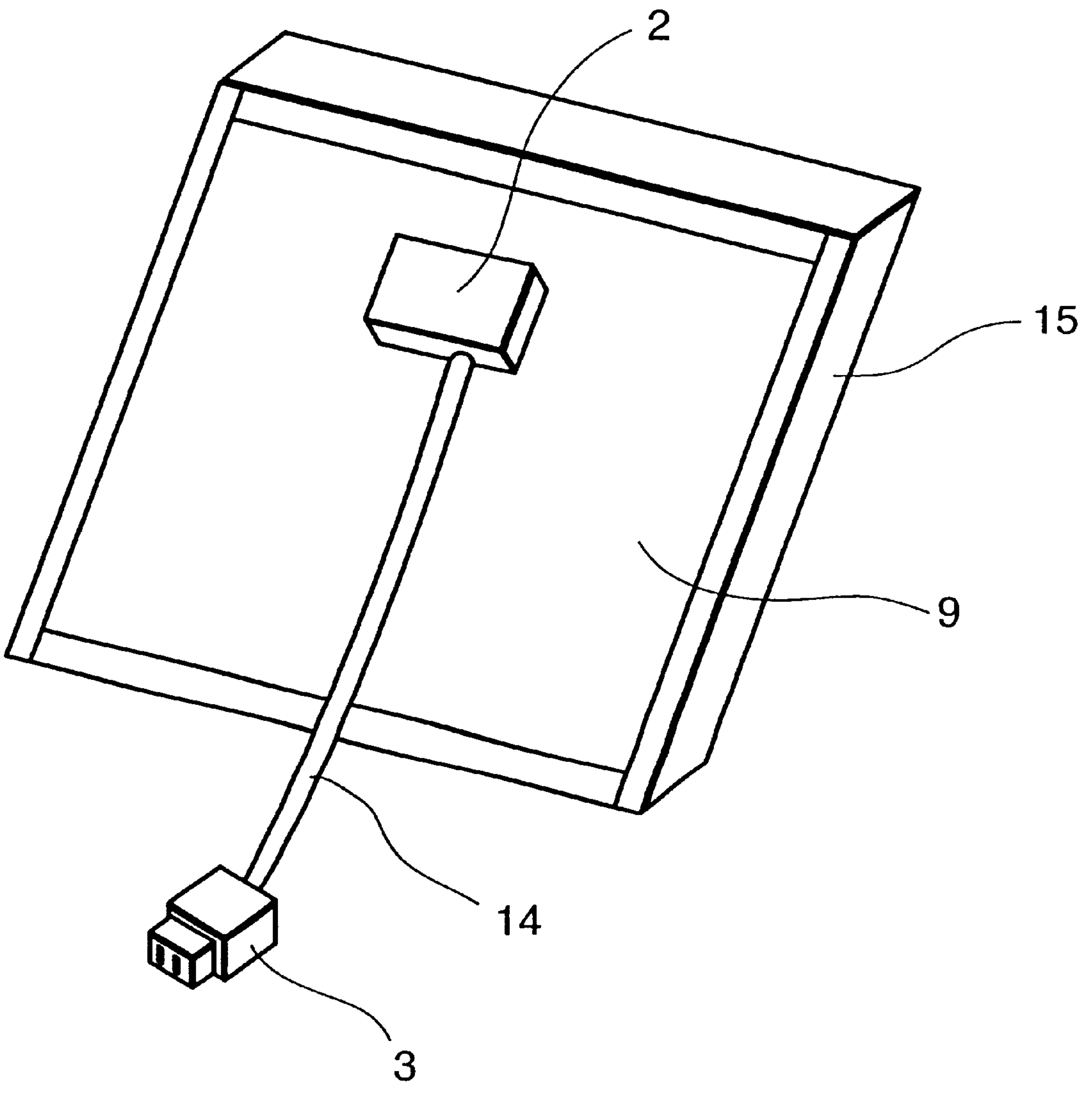
FIG. 8 is a conceptual view showing the structure of a power generating apparatus according to the first embodiment using a solar battery module as the power supply.

FIG. 8 schematically illustrates a power generating apparatus according to the first embodiment. Here the solar battery module 9 has a structure of the kind shown in FIG. 7. Polycrystalline silicon is used for the photovoltaic elements 10, reinforced glass as the front cover 11, EVA resin as the filler 12, and film in which aluminum foil is sandwiched by fluoroplastic as the back cover 13.

The photovoltaic elements 10 of polycrystalline silicon are serially interconnected and the output thereof is extracted through a hole provided in the back cover 13. The power converter 2 is connected to this output by soldering and is attached to the back side of the back cover 13 of the solar battery module 9 by a silicon adhesive.

A flat vinyl cord having a protective coating is used as the electric output line 14 for the AC output of the power converter 2, and the plug 3 shown in FIG. 3 is connected to the end of the cord. The functions for preventing stand-alone operation of the power converter are of the passive and active types, in which the passive system is for detecting voltage phase skipping and the active system is of the reactive-power fluctuation type. With the system for detecting voltage phase skipping, the apparatus runs at a power factor of 1 at the time of system cooperation and therefore only effective power is supplied with voltage and current substantially in phase. When the stand-alone operating state is attained, however, power that also includes reactive power must be supplied from this instant and therefore a change in phase of the voltage is captured. With the reactive-power fluctuation system, the period of the output voltage of power converter 2 is fluctuated at fixed intervals. If frequency varies in dependence upon this fluctuation, then it is judged that stand-alone operation is in effect.

The plug 3 comprises the plug holder 4, the conductor terminals 5, the conductor-terminal insulating portion 6 and the resilient body 16, as shown in FIG. 3.

Tin-plated copper is used for the conductor terminals 5, a spring as the resilient body 16 and plastic for the insulating portion 6. The plug holder 4 has a plastic case the interior of which is provided with the terminal fitting 17 and screw 18 for attaching the electric output line 14. The electric output line 14 is attached by pressure welding or soldering. The plug holder 4 and insulating portion 6 are provided with the fitting portions 19 comprising a depression and corresponding protrusion. The plug holder 4 has a projection 20 to which the resilient body 16 is attached. When the insulating portion 6 is pushed, it slides into and is received by the plug holder 4. When the insulating portion 6 has been received within the plug holder 4, the conductor terminals 5 protrude from the insulating portion. In order to identify the locations from which the conductor terminals 5 will protrude so that it will be easy to insert the plug into the outlet, the insertion protuberances 21 and arrow indications 22 (see FIG. 2) are provided above and below the holes in the insulating portion 6 from which the conductor terminals 5 will project. In other words, the insertion protuberances 21 and arrow indications 22 serve as guides to facilitate the electrical connection of the conductor terminals 5 to the outlet.

When the plug 3 is inserted into the outlet, first the insertion protuberances 21 are aligned with and fitted into the outlet insertion holes using the arrow indications 22 as a guide, then the plug is pushed into the outlet in the manner of an ordinary plug. When the insulating portion 6 is pressed against the outlet at this time, the insulating portion 6 slides into and is received by the plug holder 4 while compressing the resilient body 16. At the same time, the conductor terminals 5 protrude from the insulating portion 6 and mate with conductor terminals within the outlet.

Figure 9:
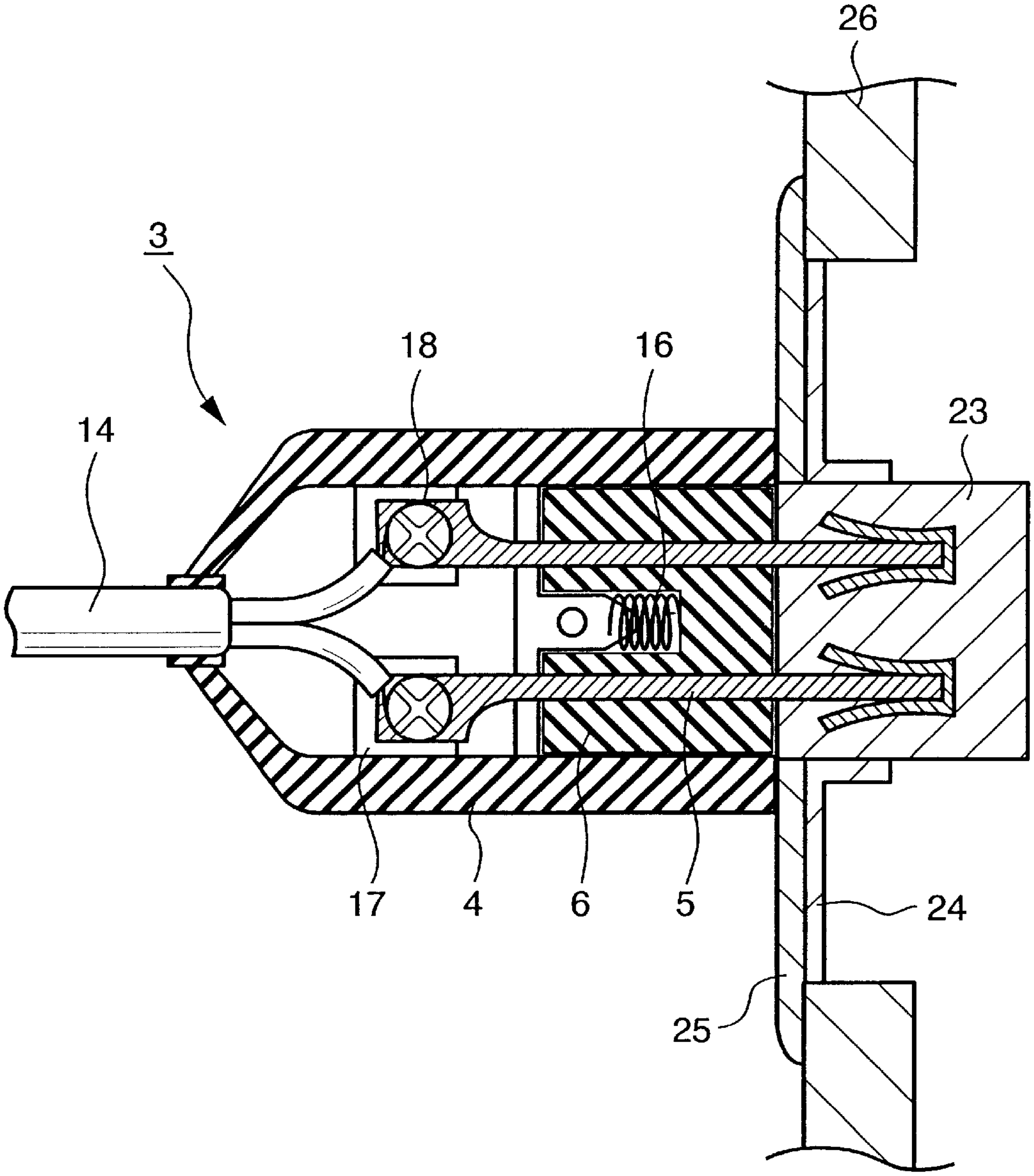
FIG. 9 is a diagram showing the plug of the first embodiment inserted into an outlet.

When the plug 3 is thus inserted into an outlet, the result is as depicted in FIG. 9. Also shown in FIG. 9 are a recessed outlet 23, a mounting frame 34, a plate 25 and a wall 26.

When the plug 3 is pulled out of the outlet 23, the conductor terminals 5 withdraw from the clamping portions of the conductor terminals within the outlet and, as a result of the force that attempts to restore the resilient body 16 to its original state, the insulating portion 6 received within the plug holder 4 slides and the conductor terminals 5 are thus protected. At the same time, when the conductor terminals 5 withdraw from the conductor terminals inside the outlet, absence of current flow from the side of the commercial power supply is detected by the control circuit within the power converter 2 and operation is interrupted by the stand-alone operation preventing function.

Thus, since the structure of the apparatus is such that the conductor terminals 5 cannot readily be touched during the time needed for the stand-alone operation preventing function to operate, the plug 3 can be pulled out safely. Further, since the insulating portion 6 is formed as an integral part of the plug, the structure is stronger than that in which only the outer peripheral portion of the conductor terminals 5 is protected. As a result, there is little risk of damage and assembly can be accomplished with higher productivity.

(Second Embodiment)

An example of a power generating apparatus of the present invention using the solar battery module 9 as the power supply 1 will be described as a second embodiment.

Figure 10:
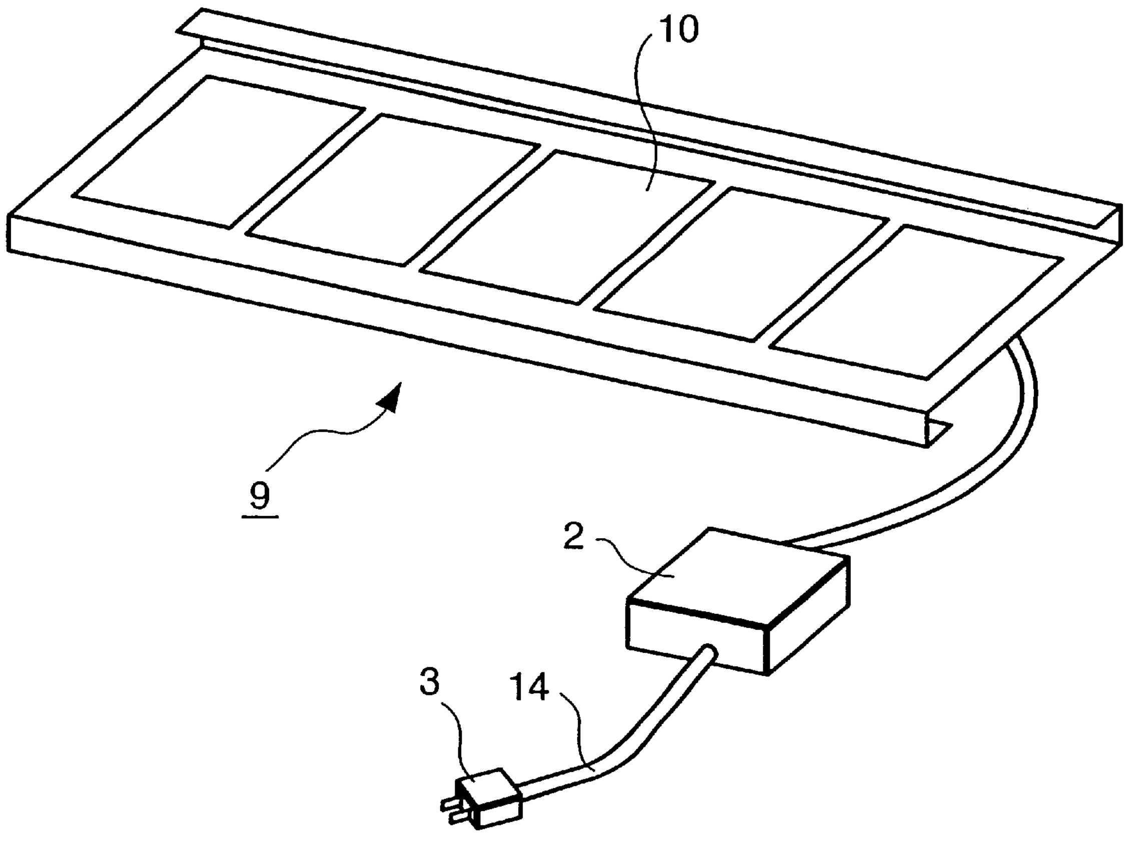
FIG. 10 is a conceptual view showing the structure of a power generating apparatus according to the second embodiment using a solar battery module as the power supply.

FIG. 10 schematically illustrates a power generating apparatus according to the second embodiment. Here the solar battery module 9 has a structure of the kind shown in FIG. 7. The photovoltaic element 10 uses an amorphous-silicon solar battery formed on a stainless substrate, fluoroplastic is used for the front cover 11, EVA resin is used for the filler 12, and a steel plate that is plated with an alloy of molten zinc and 55% aluminum is used for the back cover 13.

The amorphous-silicon photovoltaic elements 10 of polycrystalline silicon are serially interconnected and the output thereof is extracted through a hole provided in the back cover 13. A terminal box is attached to the hole and the electric output line is connected to the output inside the terminal box. A connector is attached to the end of the electric output line and this can be connected to the input connector of power converter 2.

A 600 V vinyl-insulated vinyl-sheath flat cable (VVF) is used as the electric output line 14 for the AC output of the power converter 2, and the plug 3 shown in FIG. 4 is connected to the end of the line 14. The functions for preventing stand-alone operation of the power converter are of the passive and active types, in which the passive system is a system for detecting a sudden increase in voltage of third-order higher harmonics and the active system is of the frequency shifting type.

The plug 3 comprises the plug holder 4, the conductor terminals 5, the conductor-terminal insulating portion 6 and the resilient body 16, as shown in FIG. 4.

Tin-plated copper is used for the conductor terminals 5, a spring as the resilient body 16 and plastic for the insulating portion 6. The plug holder 4 has a plastic case the interior of which is provided with the terminal fitting 17 and screw 18 for attaching the electric output line, and the terminal fitting 17 has been machined so that it will be contacted by the base end of the conductor terminal 5 when the conductor terminal is inserted into the outlet. (The machined portion of the terminal fitting 17 and the base end of the conductor terminal 5 construct the connecting portion 7.)

The plug holder 4 and insulating portion 6 are provided with the fitting portions 19 comprising a depression and corresponding protrusion. The plug holder 4 has the projection 20 to which the spring 16 is attached. When the insulating portion 6 is pushed, it, together with the conductor terminals 5, slides into and is received by the plug holder 4. The conductor terminals 5 are fixed to the insulating portion 6 so that when the insulating portion 6 has been received within the plug holder 4, the connecting portion 7 attains the connected state.

When the plug 3 is inserted into the outlet 23, the conductor terminals 5 are inserted into the outlet insertion holes and the plug is pressed against the outlet in the manner of an ordinary plug. When the insulating portion 6 of the plug is pressed against the outlet at this time, the insulating portion 6, which is integrated with the conductor terminals 5, slides into the plug holder 4 while compressing the resilient body 16, and the base end of the conductor terminal 5 mates with the machined portion of the terminal fitting 17 to make electrical contact therewith.

Figure 11:
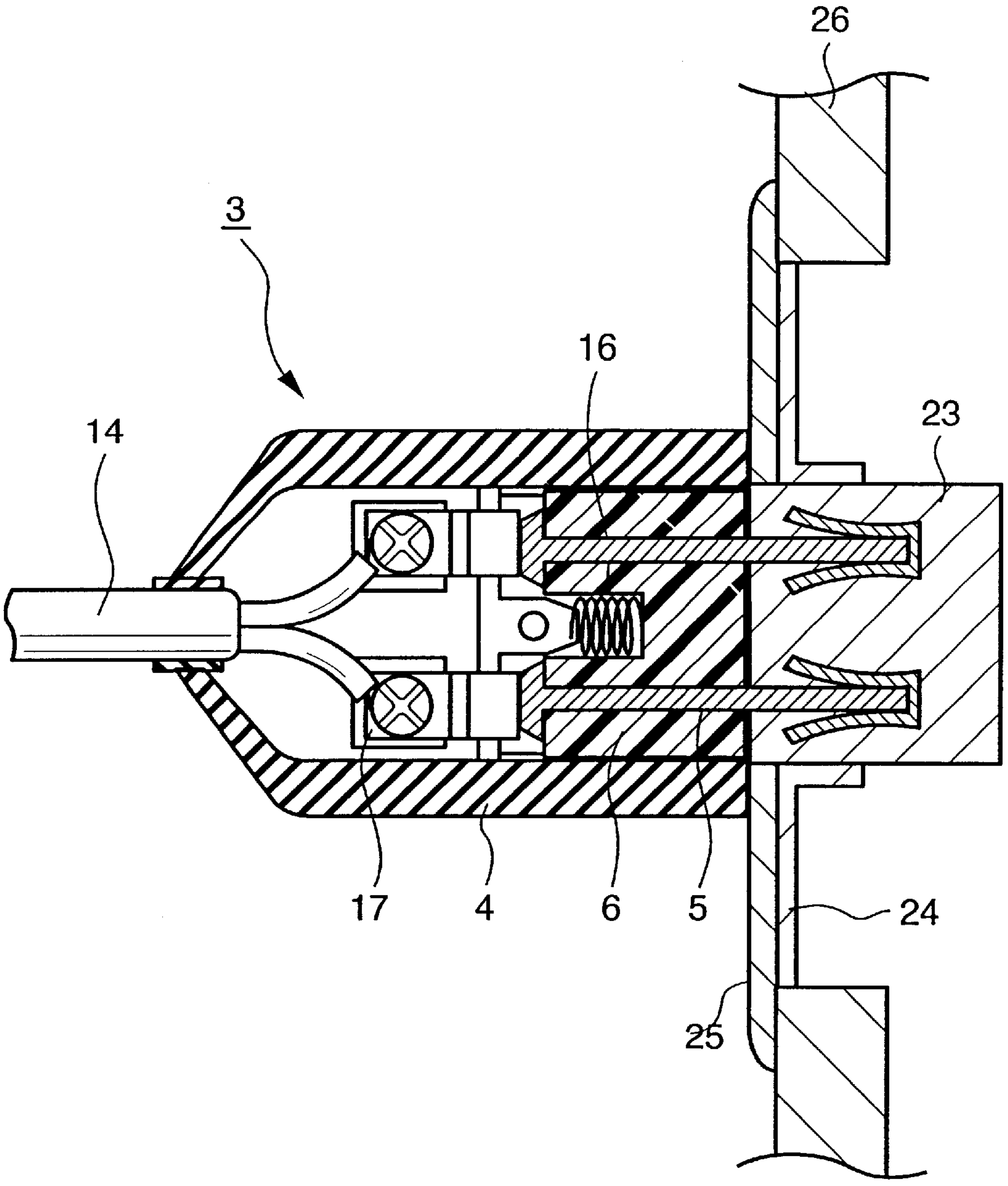
FIG. 11 is a diagram showing the plug of the second embodiment inserted into an outlet.

When the plug 3 is thus inserted into the outlet 23, the result is as depicted in FIG. 11. When the plug 3 is pulled out of the outlet 23, the conductor terminals 5 withdraw from the clamping portions of the conductor terminals within the outlet and, as a result of the force that attempts to restore the resilient body 16 to its original state and the contact resistance offered by the conductor terminals inside the outlet 23, the conductor terminals 5 and insulating portion 6 received within the plug holder 4 slide so that contact within the connecting portion 7 is broken. At the same time, when the conductor terminals 5 separate from the conductor terminals inside the outlet, absence of current flow from the side of the commercial power supply is detected by the control circuit within the power converter 2 and operation is interrupted by the stand-alone operation preventing function.

Thus, owing to the structure of the plug 3 and the function for activating and deactivating the power converter 2 by sensing current from the side of the commercial power supply within the power converter 2, the arrangement of the connecting portion 7 is such that current will not flow from the side of the power converter 2 to the conductor terminals 5 during the time needed for the stand-alone operation preventing function to operate following the withdrawal of the plug 3 from the outlet 23. As a result, the user will not receive an electric shock even if the user touches the conductor terminals 5. This means that full safety is assured even in the event of malfunction or damage.

(Third Embodiment)

An example of a power generating apparatus of the present invention using the solar battery module 9 as the power supply 1 will be described as a third embodiment.

Figure 12:
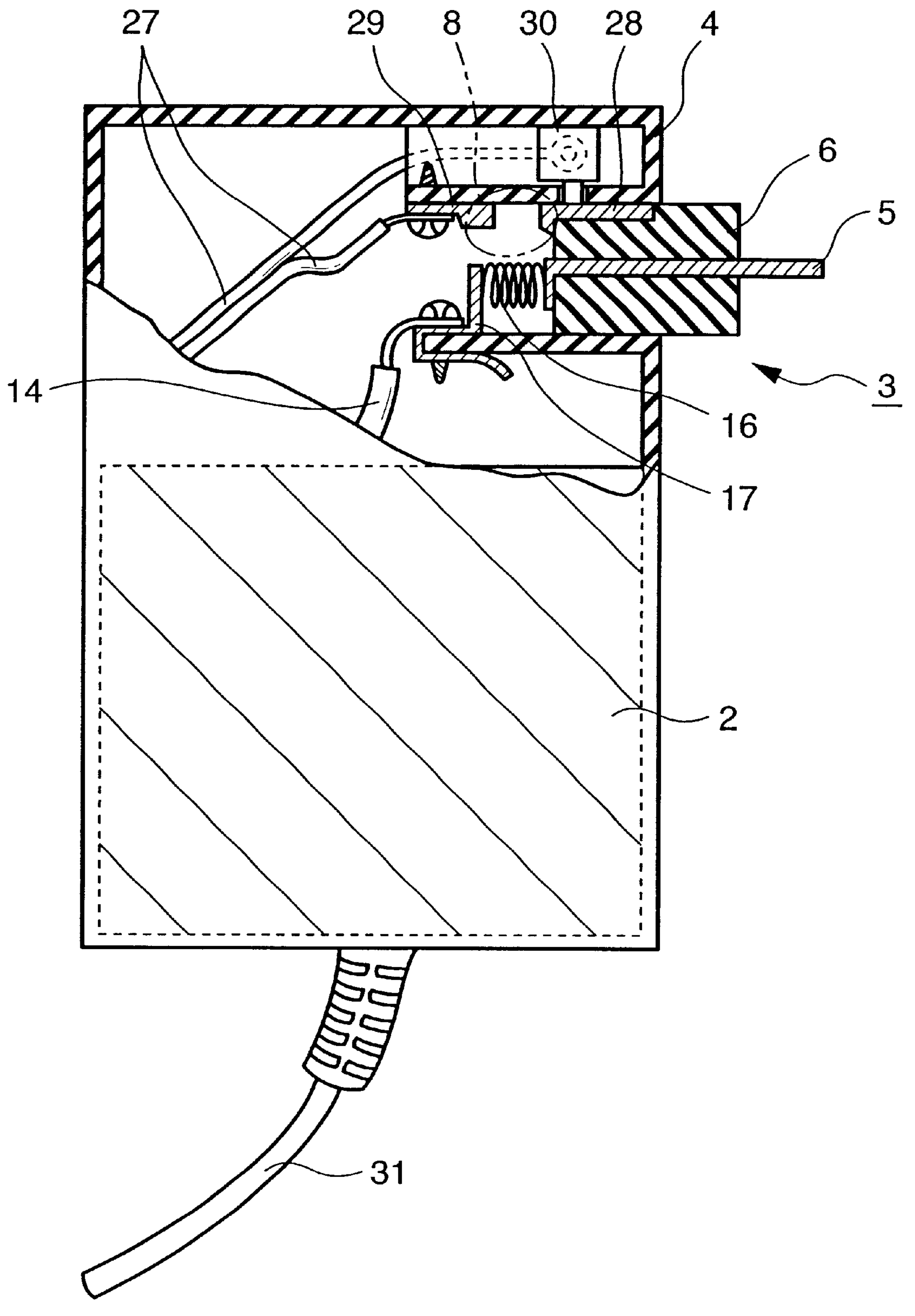
FIG. 12 is a schematic view showing an integrated-plug-type power converter according to the third embodiment.

FIG. 12 schematically illustrates a power generating apparatus according to the third embodiment. Also shown in FIG. 12 are signal lines 27, a contact fitting 28, signal terminal fittings 29 and 30, and an input connector 31.

As shown in FIG. 12, the power converter 2 according to the third embodiment is integrated with the plug 3 and the AC output of the power converter 2 is supplied directly to the plug 3. The functions for preventing stand-alone operation of the power converter 2 are of the passive and active types, in which the passive system is a system for detecting rate of change in frequency and the active system is a reactive-power fluctuation system.

The plug 3 comprises the plug holder 4 integrated with the power converter 2, the conductor terminals 5, the conductor-terminal insulating portion 6, the resilient body 16 and the terminal fitting 17.

Tin-plated copper is used for the conductor terminals 5, a spring as the resilient body 16 and plastic for the insulating portion 6. The terminal fitting 17 and conductor terminal 5 are electrically connected to the resilient body 16 at all times.

The main body of the plug 3 has a plastic case the interior of which is provided with the signal terminal fittings 29 and 30 for controlling the start/stop signal within the power converter 2. The insulating portion 6 is provided with the contact fitting 28 which, together with the signal terminal fitting 29, constructs the switch 8. The signal terminal fitting 30 is electrically connected to the contact fitting 28 at all times. It should be noted that the signal terminal fitting 30 may be provided on the side of the insulating portion 6 or may be integrated with the contact fitting 28. The signal from the switch 8 thus constructed can be used as the start/stop signal within the power converter.

When the plug 3 integrated with the power converter 2 of the third embodiment is inserted into the outlet (not shown), the conductor terminals 5 are inserted into the outlet insertion holes and the plug is pressed against the outlet in the manner of an ordinary plug. When the insulating portion 6 of the plug is pressed against the outlet at this time, the resilient body 16 is compressed and the signal terminal fitting 29 and contact fitting 28 come into contact (closing the switch 8) so that the start/stop signal enters and activates the power converter.

When the plug 3 is pulled out of the outlet, the conductor terminals 5 withdraw from the clamping portions of the conductor terminals within the outlet and, as a result of the force that attempts to restore the resilient body 16 to its original state and the contact resistance offered by the conductor terminals inside the outlet, the conductor terminals 5 and insulating portion 6 received within the plug holder 4 slide so that the signal terminal fitting 29 and contact fitting 28 break contact with each other (thereby opening the switch 8) and the power converter stops operating. At the same time, when the conductor terminals 5 withdraw from the conductor terminals inside the outlet, absence of current flow from the side of the commercial power supply is detected by the control circuit within the power converter 2 and operation is interrupted by the stand-alone operation preventing function.

Thus, owing to the function for activating and deactivating the power converter 2 by sensing current from the side of the commercial power supply within the power converter 2 and the fact that the plug has the start/stop switch structure, current will not flow from the side of the power converter 2 to the conductor terminals 5 during the time needed for the stand-alone operation preventing function to operate following withdrawal of the plug 3 from the outlet. As a result, safety can be assured by a double shut-down mechanism even in the event of a malfunction. In the third embodiment, an example in which the plug 3 and power converter 2 are integrated is illustrated. However, the plug of the present invention can also be electrically connected to a device in which a plurality of outlets are connected in parallel in such a manner that a plurality of plugs can be plugged and unplugged, as in the manner of the so-called table tap.

The power converter, power generating apparatus and plug of the embodiments described above afford the following effects:

(1) Double safety can be assured by providing electrical safety, namely a function for preventing stand-alone operation within the power converter, and mechanical safety, namely a structure in which electrically active portions of conductor terminals are not exposed when the plug is inserted and withdrawn, or a terminal structure that operates in association with a main power-supply switch. (2) The plug can be inserted and withdrawn safely in the manner of an ordinary plug. This makes possible ready use in cooperation with the power system of an power generating apparatus. (3) Flow of current from the power generating apparatus can be halted owing to the provision of mechanical safety. (4) The apparatus can withstand repeated use owing to the provision of satisfactory mechanical strength.

As many apparently widely different embodiments of the present invention can be made without departing from the spirit and scope thereof, it is to be understood that the invention is not limited to the specific embodiments thereof except as defined in the appended claims.

What is claimed is:

1. A plug for supplying electric power by being connected to an outlet, said plug comprising:

at least two electrodes; and switches corresponding to respective ones of said electrodes, wherein said switches are closed when said electrodes are inserted into the outlet to supply the electric power to said electrodes, and are open when said electrodes are not inserted into the outlet to stop the supply of the electric power to said electrodes.

2. The plug according to claim 1, further comprising a resilient member for opening said switches when said electrodes are pulled out of the outlet.

3. A power converter having the plug set forth in claim 1.

4. The power converter according to claim 3, further comprising a control circuit for detecting current flow of the plug, and stopping operation of the power converter when absence of the current flow is detected.

5. The power converter according to claim 3, further comprising a control circuit for detecting an operation state of the power converter, and shutting off the electric power supplied to said plug when a stand-alone operation state of the power converter is detected.

6. A power generating apparatus having the plug set forth in claim 1.

7. A plug for supplying electric power by being connected to an outlet, said plug comprising:

at least two electrodes; and a switch that is opened/closed in dependence upon state of connection between said electrodes and the outlet, wherein said switch is open when said electrodes are not inserted into the outlet to stop the supply of electric power to the electrodes.

8. The plug according to claim 7, wherein said switch is closed when said electrodes are connected to the outlet.

9. The plug according to claim 7, further comprising an insulating member that can slide to cover said electrodes.

10. The plug according to claim 9, further comprising an electrode, which is part of said switch, provided on said insulating member.

11. The plug according to claim 8, wherein said switch switches a signal indicating the connection between the said electrodes and the outlet.

12. A power converter having the plug set forth in claim 7.

13. The power converter according to claim 12, further comprising a control circuit for stopping operation of the power converter when absence of the current flowed to the plug is detected.

14. The power converter according to claim 12, further comprising a control circuit for detecting an operation state of the power converter, and shutting off the electric power supplied to said plug when a stand-alone operation state of the power converter is detected.

15. The power converter according to claim 12, wherein operation of the power converter is stopped when said switch is opened/closed in dependence upon state of connection between said electrodes and the outlet.

16. A power generating apparatus having the plug set forth in claim 7.

* * * * *